Dec. 24, 1968 S. H. LAKE, JR 3,417,831
HAND TRUCK WITH POWER LIFT
Filed Aug. 15, 1966 3 Sheets-Sheet 2
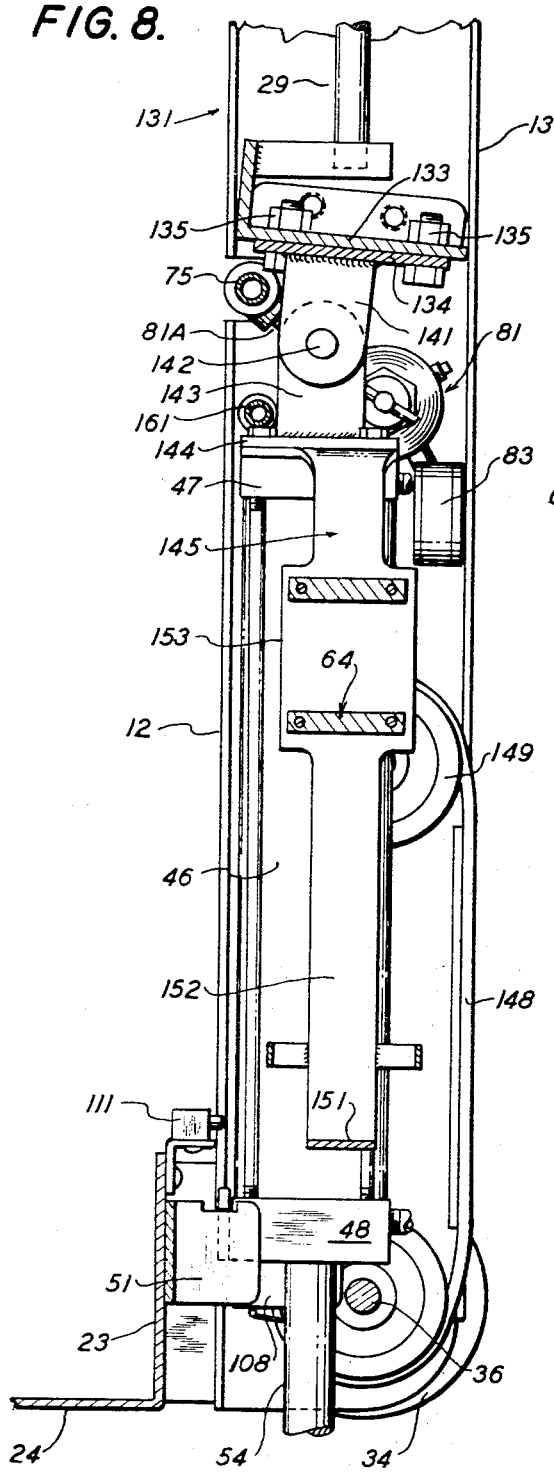
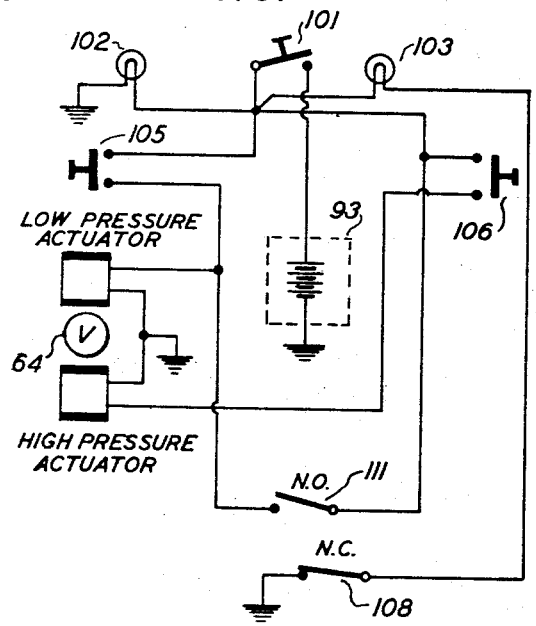
INVENTOR:
SAMUEL H. LAKE, JR.
BY
W. J. Gribble
ATTORNEY INVENTOR:
SAMUEL H. LAKE, JR.
BY
W. J. Gribble
ATTORNEY

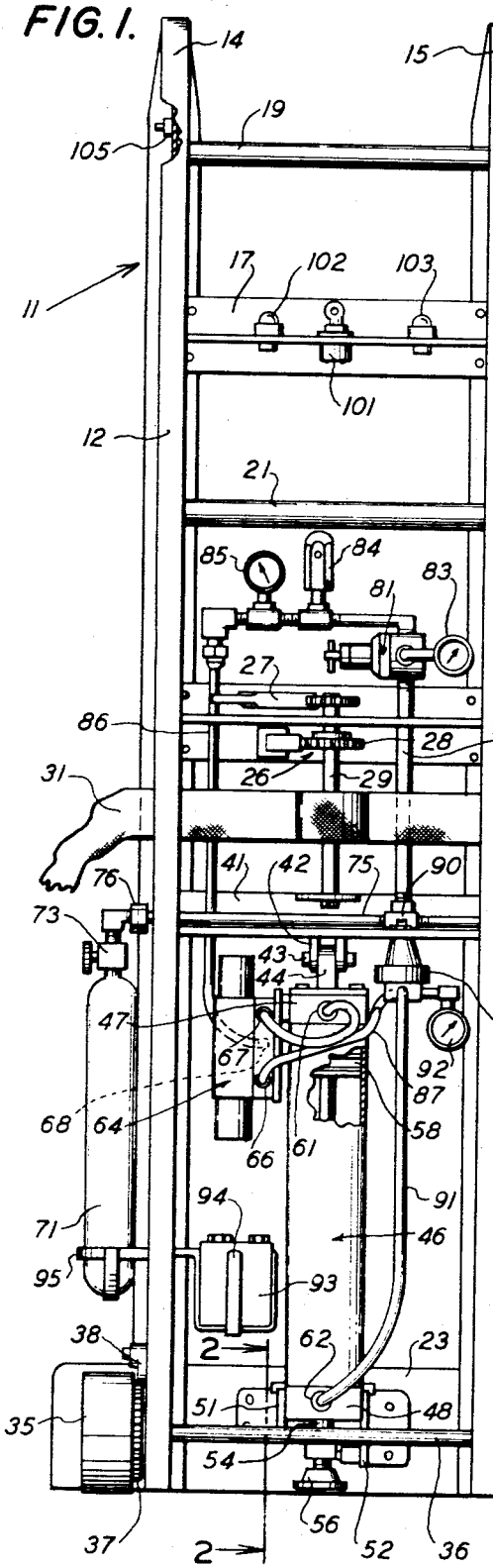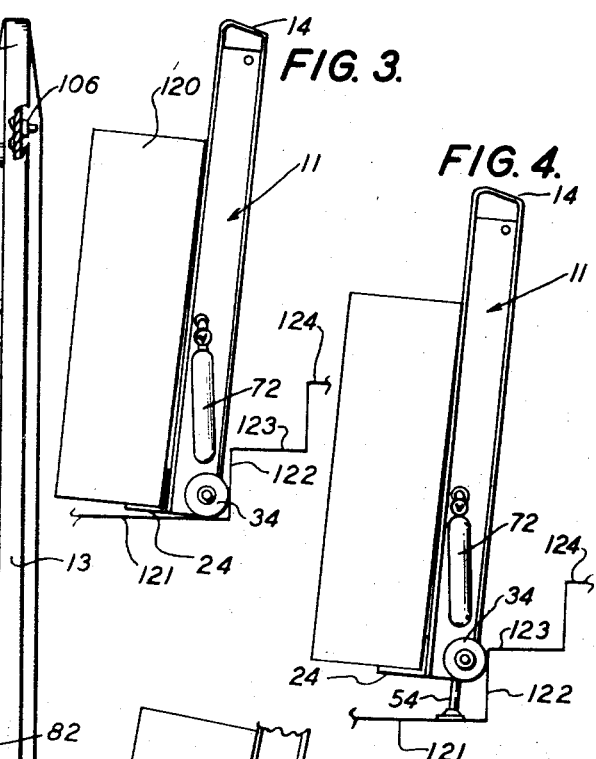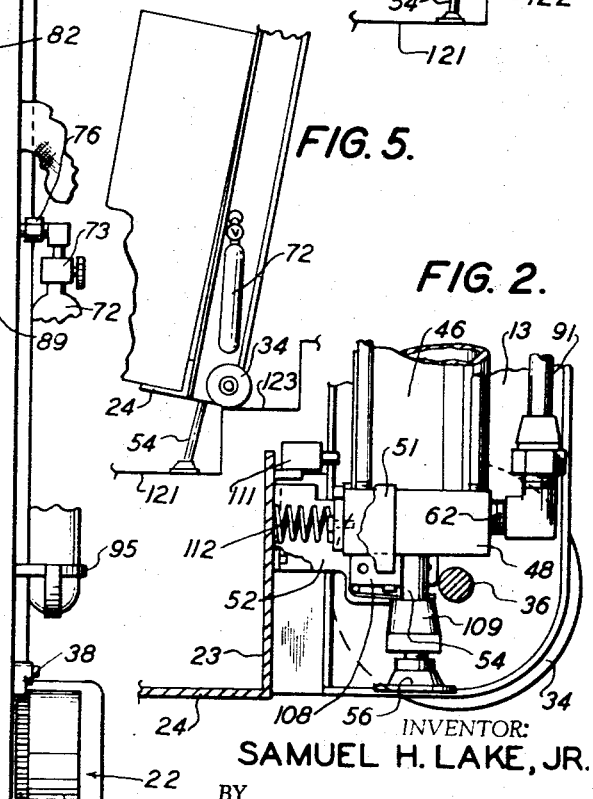

United States Patent Office 3,417,831
Patented Dec. 24, 1968

3,417,831
HAND TRUCK WITH POWER LIFT
Samuel H. Lake, Jr., 16342 Devonshire,
Granada Hills, Calif. 91344
Filed Aug. 15, 1966, Ser. No. 572,469
13 Claims. (Cl. 180—8)

ABSTRACT OF THE DISCLOSURE

A hand truck with a conventional channel frame with cross braces and a load bearing tongue on the frame members has a pneumatic lift cylinder pivoted to a cross member to swing in a plane perpendicular to the common plane of the frame members. The pneumatic cylinder has a downwardly thrusting piston rod with a contact foot which elevates the truck. A conventional liquefied $CO_2$ container carried by the hand truck frame feeds into a manifold connected to a pressure regulator or reducer feeding through a control valve to the lift cylinder. The valve controls flow to the cylinder and to a low pressure regulator connected to the cylinder for piston rod return. A piston rod return control at the base of the cylinder actuates a control valve to return the piston rod, after it has been extended to lift the hand truck, in response to the attitude of the load bearing portion of the hand truck with respect to the vertical attitude of the cylinder and piston rod.

---

The conventional hand truck, with its parallel frame members, its two bottom wheels and tongue for bearing the weight of a large load is well suited to movement along level or slightly inclined surfaces. However, when the elevation rises more than one or two steps, it is often necessary to use a second man to aid in lifting the truck and its load up a flight of stairs or a loading dock. Many attempts have been made to provide a hand truck which is capable of elevating either the hand truck and the load or just the load in order to accomplish load transition from one horizontal surface to another. Some of these attempts have required manual manipulation of cranks and hand pumps while the load is precariously balanced on a lift arrangement. Others have provided power means which do not have sufficient versatility in terms of either endurance capability or availability of outside power to be practicable. I have invented a hand truck with a power lift which utilizes the convenient, commercially available, powerful thrust of liquefied gases to implement the lift of the loaded hand truck.

The invention contemplates a hand truck for use upon a supporting surface that comprises spaced parallel frame members, cross braces between the frame members and a load bearing tongue secured to the frame members. Two wheels are rotatably secured to the frame members near the bottom ends thereof. A pneumatic cylinder having a conventional piston rod extendable from the cylinder is secured at its top to a cross brace so as to swing in a plane perpendicular to the common plane of the frame members. The exterior end of the piston rod is adapted to engage the horizontal support surface. Cylinders of liquefied gas, such as carbon dioxide, are detachably secured to the hand truck. A pressure reducing valve, preferably with a pressure gauge, is coupled to the source of liquefied gas. A low voltage solenoid operated valve intervenes between the pressure reducing means and the pneumatic cylinder. Preferably a wet battery is carried on the hand truck to operate the electrical valve.

Appropriate control switches mounted on the hand truck control the solenoid operated electric valve. Means which may be either automatic or manual are provided for causing the return of the piston rod cylinder after it has been extended through operation of the solenoid valve to lift the hand truck and its load. The piston rod withdrawal into the cylinder lowers the hand truck to bring the wheels to bear upon the raised support surface.

In a preferred embodiment of the invention, a low pressure system is used to return the piston rod in the pneumatic cylinder. The solenoid valve in this embodiment is of a nondetent type having exhaust ports such that high pressure may be used to extend the piston rod and low pressure to return it. With a nondetent solenoid valve, a simple push button switch may be used since the valve remains in the condition to which the solenoid urges it until a second impulse reaches the solenoid.

In the preferred embodiment the ability of the pneumatic cylinder to swing or pivot with respect to the hand truck frame is utilized to actuate return of the piston rod from its extended position. This embodiment includes means responsive to a change in attitude of the load bearing tongue with respect to the piston rod when the rod is extended to lift the hand truck and its load. Said means is adapted to withdraw the piston rod into the cylinder so as to lower the hand truck to bring the wheels to bear on the support surface. Resilient means opposes a change in attitude between the piston rod and the load bearing surface.

Liquefied carbon dioxide is commercially available in cylinders having their own outlet valves. The cylinders contain pressures in the range of 1000–1200 pounds per square inch. This is in contrast with the previously attempted use of pressurized gases, such as air, where available pressure range seldom can exceed 150 pounds. By processing the liquefied gas through a pressure reducer, extremely high pressures are still usable for power while conserving a great quantity of gas in liquefied form such that constant refill of the gas cylinders is unnecessary in accomplishing the majority of stair progressions, for instance.

Preferably the wheels of the hand truck of the invention have ratchet cogs and ratchet latches such that the wheels, when placed upon a step, do not roll forward but only toward the riser at the back of the step. The operator need only tilt the hand truck toward the riser once the wheels have lifted to clear the front edge of the step. Stability is thus provided which enables one man to do the job previously done by two.

These and other advantages of the invention are apparent from the following description and drawing in which:

FIG. 1 is a schematic elevational view from the face of the hand truck opposite the load showing the arrangement of the components of the inventive hand truck;

FIG. 2 is a fragmentary sectional elevation taken along line 2—2 of FIG. 1 showing the attitude-actuated control means for withdrawal of the piston rod;

FIGS. 3, 4 and 5 illustrates schematically the operative steps in elevating a loaded hand truck in accordance with the invention;

FIG. 6 is a schematic wiring diagram of the embodiment of FIG. 1;

FIG. 8 is a fragmentary sectional elevation taken along line 8—8 of FIG. 7.

In the figures like elements have like reference characters.

Figure 7:
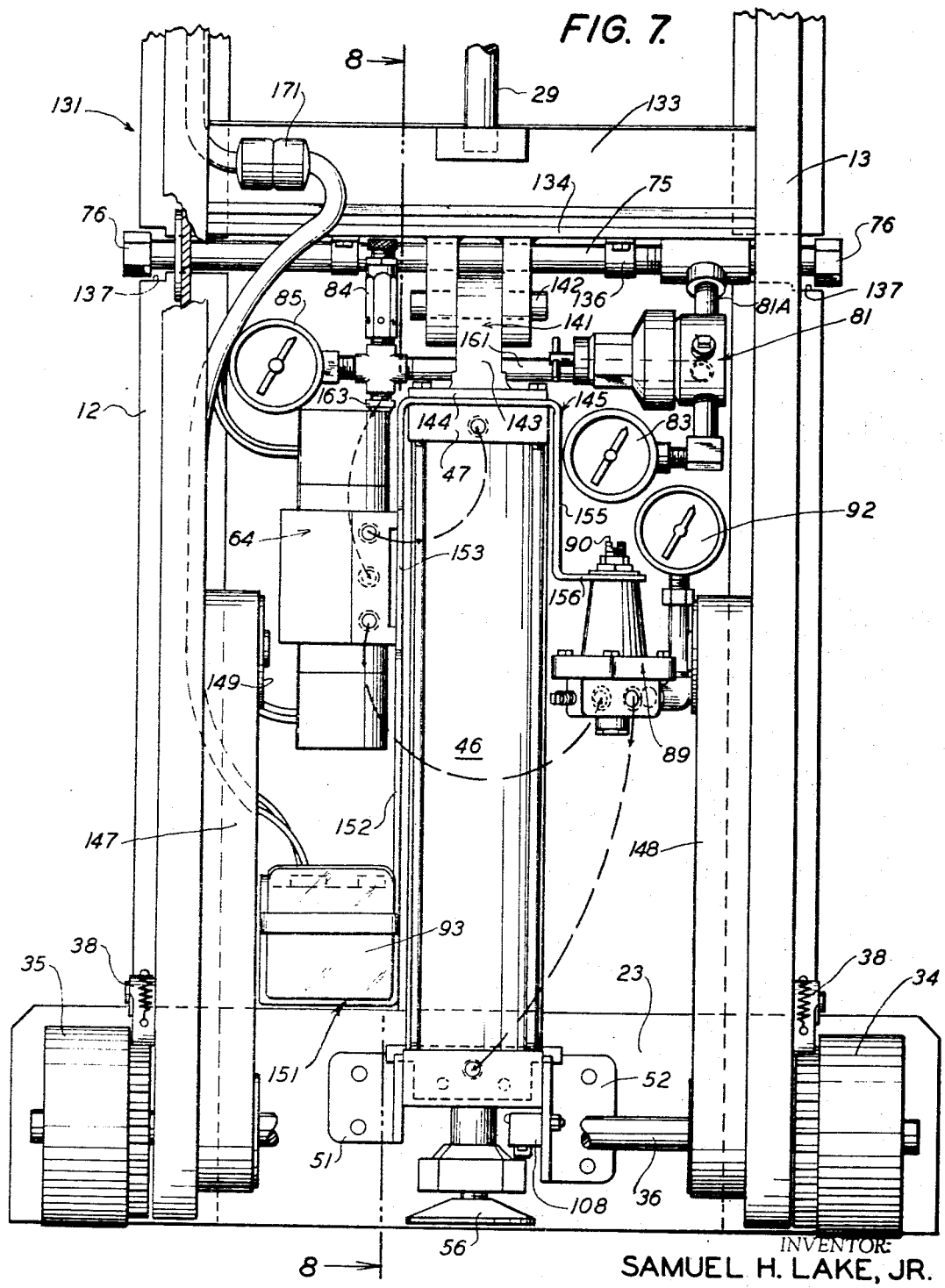
FIG. 7 is a fragmentary rear elevational view of an alternate embodiment of the invention with a detachable power lift packet.

In FIGS. 1 and 2 a hand truck 11 has conventional spaced parallel side rails 12 and 13. The side rails are elongate I-beams which terminate at their tops in loop handles 14, 15. T-shaped cross braces 17 and 18 extend between the side frame members at vertical intervals as do tubular braces 19, 21. A bottom brace 22 extends between the side frame members at their bottom and extends outwardly a short distance beyond each frame member. Brace 22 has an upward flange 23 and a horizontal flange or load bearing tongue 24. The face of the frame members securing the load bearing tongue will be referred to as the front face of the hand truck. The face of the frame members remote from the load bearing tongue will be referred to as the rear face of the hand truck.

Cross brace 18 supports a load restraining belt mechanism 26, which has a ratchet handle 27 and a lock ratchet 28 and a central shaft 29 about which the securing belt 31 is double wrapped, all in conventional fashion. The hand truck of the invention also has two load bearing wheels 34, 35 freely rotatable on an axle which extends between side members and outwardly beyond the frame members to accommodate the wheels. Each load bearing wheel has a ratchet cog 37 attached to the wheel adjacent the frame member. A spring-loaded ratchet dog 38 is pivotally secured to a frame member adjacent each cog.

A thrust brace 41 extends between the frame members below the restraining belt. The thrust brace may be angle iron and be secured in suitable fashion to the webs of the side frame members. A clevis 42 extends downwardly from the thrust brace. A pivot pin 43 secures a pivot ear 44 of a pneumatic cylinder 46 to the thrust brace clevis. The pneumatic cylinder is conventional in design, having square end pieces 47, 48 at its top and bottom, respectively. End piece 48 is guided between two rearwardly extending plates 51, 52 attached to upper flange 23 of load bearing tongue 24. The plates guide the pneumatic cylinder when it pivots about pin 43 in a plane perpendicular to the common plane of the frame members.

A piston rod 54 is extendible from the pneumatic cylinder. A lift foot 56 is fixed to the bottom portion of the piston rod.

The pneumatic cylinder contains a conventional piston 58 to which the piston rod is secured. The cylinder has an upper port 61 and a lower port 62 adapted to receive gas under pressure to displace the piston and the rod back and forth with respect to the cylinder.

Preferably, a solenoid operated control valve, such as the valve 64, controls the flow of gas to the two ports of the pneumatic cylinder. The valve has two delivery ports 66, 67 and an inlet port 68. The control valve for the pneumatic cylinder also has conventional exhaust ports coordinated with the delivery ports for operation of the pneumatic cylinder. Such a valve for control of pneumatic cylinders is sold under the trade name "Alcon," and is available in several performance categories. The particular valve which has proved to be effective in the hand truck operation is rated at 175 pounds per square inch and operates on 6 volts.

Gas for operating the pneumatic cylinder is provided from a pair of liquefied gas cartridges 71, 72. Each cartridge is connected through its integral valve 73 to a manifold 75 by a conventional high pressure threaded coupling 76. While there are several liquefied gases which can accomplish the purposes of the invention, liquefied carbon dioxide is preferred because of its commercial availability, its relative safety and the large capacity gas supply. One commercial cartridge has proved to be capable of lifting hand trucks and load up 80–90 steps. Cartridges with liquefied carbon dioxide under pressures of 1000 to 1200 pounds per square inch are commonly used as a means of carbonating beverages, such as beer, which are dispensed from bulk containers. Therefore, the commercial availability of such cartridges is as widespread as that particular beverage.

A pressure reducing valve 81 is connected to the manifold by a rigid conduit 82. A high pressure gauge 83 may be used in conjunction with the regulator, which is adjustable. From the regulator gasified carbon dioxide flows through a pop-off valve 84 and a second pressure gauge 85 to a supply line 86 which goes to inlet port 68 of the control valve.

A conduit 87 connects an outlet port of the control valve to the pneumatic cylinder. A second conduit 88 connects to a low pressure regulator 89 secured to thrust brace 41. A regulating screw 90 extends through the thrust brace and is accessible for adjustment of regulator 89. A conduit 91 extends from the low pressure regulator to inlet port 62 of the pneumatic cylinder. A third low pressure gauge 92 may be connected to the regulator.

Electrical power for the operation of the cylinder control valve is supplied from a conventional wet battery 93 held in a yoke 94 secured to the web of frame members 12. The battery may be of the type conventionally used on light motorcycles. The bottom ends of liquid cartridges 71, 72 may also be held in yoke 95 for stability.

Once the proper gas pressures have been established at the various points, the hand truck is operated by controlling solenoid operated valve 64. A primary on-off switch 101, which is key controlled, is conveniently located on upper cross brace 17. Indicator lights 102, 103 are located on the cross brace near the on-off switch, Light 102 indicates current flow and indicator 103 shows when foot 56 is extended.

A push button switch 105 near handle 14 induces change in the cylinder control valve such that gas is introduced into port 62 of the cylinder. An oppositely positioned push button switch 106 conditions the valve for pressure flow to port 61. A first limit switch 108 supported by guide plate 52 is connected to indicator light 103. As can be seen from FIG. 2, when the lift foot is retracted the lever arm of the limit switch is contacted by a pivot rod boss 109 causing the switch, which is normally closed, to open the circuit and turn off light 103.

A second limit switch 111 supported from flange 23 of the load bearing tongue comes into contact with the surface of cylinder 46 when tongue 24 changes its attitude with respect to the piston rod. One or more compression springs 112 oppose such a change in attitude. The springs extend from flange 23 to the front face of cylinder end piece 48 between the spaced guide plates 51, 52. When switch 111 is actuated by a change in attitude, the solenoids change condition of the control valve, causing retraction of the piston rod and the lift foot.

The operaton of the hand truck of the invention is illustrated by FIGS. 3, 4 and 5. In FIG. 3 the hand truck 11, with a load 120 balanced on tongue 24 and leaning against the front face of the frame members, has been rolled along a horizontal support surface 121 up to the point where the wheels contact a riser 122 of a stair 123. It is desired to lift the hand truck and its load up stair 123 and succeeding stairs, such as stair 124.

When the wheels touch the riser, push button 106 is manually operated, causing the control valve to deliver pressurized gas through the conduit from valve port 67 to cylinder port 61. Piston 58 is thereby displaced in the cylinder thrusting lift foot 56 against surface 121. The hand truck and its load are thus elevated on the piston rod, as shown in FIG. 4, with the wheels in contact with riser 122. When the wheels of the rising truck clear the edge of step 123, the weight of the load or the operator tilts the hand truck backwardly with respect to piston rod 54, bringing the wheels above the stair 123. As previously described, when the attitude of tongue 24 is changed with respect to piston rod 54, as it is in FIG. 5, limit switch 111 is actuated, activating a change in the condition of control valve 64 and causing low pressure gas to displace the piston and withdraw the piston rod and lift foot. The high pressure gas from the other side of the piston is automatically exhausted through the control valve when the change in condition of the valve takes place.

As soon as the piston rod is retracted the wheels come to rest on stair 123. The ratchet dogs 38 then prevent forward rotation of the wheels such that the wheels remain upon the stair tread. When indicator light 103 shows that the piston rod is completely retracted, the hand truck is rolled backward by the operator against the riser of the next step in the orientation shown in FIG. 3 and the process is repeated.

FIG. 6 illustrates the hand truck electrical control circuit in diagrammatic form. The circuit uses a ground return system in which one terminal of the battery is grounded, as are indicator light 102, the normally closed limit switch 108 and each of the solenoids actuating the cylinder control valve. Preferably the valve is of a nondetent type, such that the condition of the valve imposed by the actuated solenoid is maintatined without the necessity of continuing current. Therefore, make-break switches are used for the push button switches 105, 106.

FIGS. 7 and 8 illustrate an alternate embodiment of the hand truck of the invention which is similar in operation to the embodiment previously described. However, the hand truck 131 of FIGS. 7 and 8 has the various elements of the inventive apparatus differently arranged. The hand truck has conventional side frame members 12 and 13 with cross braces as previously described.

However, in the present embodiment, a thust brace 133 receives the thrust of the cylinder from a mounting plate 134 which is secured removably to the thrust brace by fasteners, such as the bolts 135. Preferably the thrust brace is canted upwardly toward the front face of the hand truck to facilitate removal of the mount plate forwardly of the hand truck. High pressure manifold 75 of the hand truck is fixed to the mounting plate by clips 136. Cut-outs 137 in the front flange of the frame members permit forward removal of the high pressure manifold with the $CO_2$ cartridges (not shown) attached to the extending ends of the manifold.

Cylinder 46 is pivotally secured to the mount plate by a clevis assembly 141 and pivot pin 142. The clevis ear 143 is fixed to a square plate 144, which is bolted through a suspension yoke 145 to the upper end piece 47 of the cylinder.

The suspension yoke extends downwardly between the pneumatic cylinder and one of a pair of conventionally arranged endless belts 147, 148 which extends around pulleys on axle 36 and pulleys 149 fixed to the web of the side frame member. A battery cage 151 depends from the bottom of long suspension yoke leg 152. Above the battery cage the leg widens in a mounting platform 153 for solenoid operated control valve 64.

A shorter suspension leg 155 extends downwardly on the other side of the pneumatic cylinder in the space between the cylinder and endless belt 148. An adjustable low pressure regulator 89 depends from a yoke arm 156 extending horizontally from leg 155. A low pressure gauge 92 is connected by conventional means to the low pressure regulator. The regulator is oriented with respect to the plane of the frame members such that the connecting ports are on skew lines. This enables the projecting conduits to avoid belt 148 and other appurtenances of the hand truck confined within the framework of the truck and not interfering with front and rear face clearances.

Similarly, the manifold T is skewed with respect to the vertical plane of the frame members. A nipple 81 extends from the T to support a pressure reducer 81. The pressure reducer supports a high pressure gauge 83 in the space between the low pressure regulator and the pressure reducer.

A rigid conduit 161 extends horizontally from one of the ports of the pressure reducer. The conduit terminates in an X pipe connector from which a pressure relief valve 84, a pressure gauge 85 and a semi-flexible conduit 163 extend. The path of conduit 163 is shown by broken lines. The paths of the conduits running between the output ports of the cylinder control valve and thee intake ports of the pneumatic cylinder are also shown by broken lines.

The embodiment of FIGS. 7 and 8 is combined with the first and second limit switches and biasing means previously shown and described with respect to FIG. 2. However, in the present embodiment bias springs 112 are fixed to flange 23 of the load bearing tongue and do not remove with the pneumatic cylinder when the entire lift mechanism is removed from the hand truck by the demounting of the mounting plate from the thrust brace. A male and female electric plug assembly 171 is conveniently utilized to break the electrical connections between the components being removed from the hand truck and the control switches and indicator lights remaining on the hand truck.

The latter described embodiment has several commercial advantages, among them being the ability to materially reduce the weight of the hand truck when the lift power is not required. Additionally, it is convenient to have a contained unit with all of the power lift appurtenances which may be removed from the hand truck for maintenance or repairs without affecting the general utility of the hand truck. It is also possible to adapt a conventional hand truck to a power lift operation by attachment of the unitized power lift assembly described.

The gauges have proved helpful in the adjustment and operation of the hand truck during experimental use. However, when procedures and performances are established by continuing use only those gauges required by safety laws and precautions need be a part of the assembly.

By utilizing a support yoke for the control valve, battery and low pressure regulator, leaks induced by changing stresses on copper tubing are obviated since all conduits move with the cylinder. The illustrated embodiments of the invention have been shown to be practicable and commercially feasible. Other modifications than those shown will occur to those skilled in the particular art.

I claim:

1. A hand truck for use on a support surface comprising spaced parallel frame members, cross braces between the frame members, a load bearing platform secured to the frame members, wheels rotatably secured to the frame members at the bottom ends thereof, a pneumatic cylinder secured at one end to a cross brace so as to swing in a plane normal to the common plane of the frame members, a piston rod extendible therefrom, the exterior end of the piston rod being adapted to thrust against a horizontal support so as to raise the hand truck surface, a source of liquefied gas detachably secured to the hand truck, pressure reducing means coupled to the source, a cylinder control valve coupled to the reducing means, conduit means linking the control valve to the pneumatic cylinder, control means for the control valve, and rod retracting control means responsive to the vertical attitude of the hand truck load bearing portion with respect to the cylinder operative when the piston rod is extended to lift the truck adapted to withdraw the piston rod into the cylinder so as to lower the hand truck so that the wheels bear on the support surface.

2. A hand truck in accordance with claim 1 wherein the control means for the valve comprises an electrical power source on the hand truck, solenoids operable to change the condition of the control valve, and a control switch in series with the valve and the power source.

3. A hand truck in accordance with claim 2 wherein the liquefied gas is carbon dioxide.

4. A hand truck in accordance with claim 2 wherein the source of liquefied gas is one or more valved cartridges containing liquefied carbon dioxide.

5. A hand truck in accordance with claim 2 further comprising means for detachably securing as a unit the cylinder, the pressure reducing means, the control valve, the electrical power source and the conduit means to the frame member and cross brace assembly.

6. A hand truck in accordance with claim 2 wherein the retraction control means comprises a control switch operable to actuate the control valve so as to exhaust fluid from one end of the cylinder and introduce fluid at the other end of the cylinder.

7. A hand truck in accordance with claim 2 wherein the retraction control means comprises a first limit switch closed by extension of the piston rod, resilient means urging the load bearing platform away from the piston rod, and a second limit switch contacted operatively by the cylinder when the change in vertical attitude of the load bearing hand truck portion overcomes the resilient means.

8. A hand truck in accordance with claim 7 further comprising means for detachably securing as a unit the cylinder, the pressure reducing means, the control valve, the electrical power source and the conduit means to the frame member and cross brace assembly.

9. A hand truck for use on a support surface comprising spaced parallel frame members, cross braces between the frame members, a load bearing platform secured to the frame members, wheels rotatably secured to the frame members at the bottom ends thereof, a pneumatic cylinder secured to a cross brace so as to swing in a plane normal to the common plane of the frame members, a piston rod extendible therefrom, a lift foot on the exterior end of the piston rod adapted to engage a horizontal support surface, a valved cartridge of liquefied carbon dioxide gas detachably secured to the hand truck, pressure reducing means coupled to the source, an electrically operated cylinder control valve coupled to the reducing means, a conduit linking the valve to one port of the pneumatic cylinder, a low pressure regulator linked between the valve and the other port of the cylinder, an electrical power source on the hand truck, a control switch in series with the control valve and the electrical source, electrical means responsive to a change in attitude of the load bearing platform with respect to the piston rod when the rod is extended to lift the truck, said means adapted to cause withdrawal of the piston rod into the cylinder so as to lower the hand truck so that the wheels bear on the support surface, resilient means opposing a change in attitude between the piston rod and the load bearing platform, and ratchet means on the wheels selectively operable to defeat motion of the wheels on the support surface away from the direction of desired advance of the truck.

10. A hand truck in accordance with claim 9 further comprising means for detachably securing as a unit the cylinder, the pressure reducing means, the control valve, the electrical power source and the conduit to the frame member and cross brace assembly.

11. A hand truck in accordance with claim 1 wherein the source of liquefied gas is a cartridge containing liquefied carbon dioxide.

12. A hand truck in accordance with claim 1 further comprising means for detachably securing as a unit the cylinder, the pressure reducing means, the control valve, and the conduit means to the frame member and cross brace assembly.

13. A hand truck in accordance with claim 1 wherein the retraction control means comprises resilient means urging the load bearing platform away from the piston rod, means sensing the extension of the piston rod, and second means contacted operatively by the cylinder to actuate the control valve when the change in vertical attitude of the load bearing hand truck portion overcomes the resilient means.

References Cited
UNITED STATES PATENTS

| | | |
|---|---|---|
| 2,060,344 | 11/1936 | Perkins. |
| 3,053,546 | 9/1962 | Muirhead _____ 280—5.3 |
| 3,269,478 | 8/1966 | Joslyn _____ 180—8 |
| 3,318,307 | 5/1967 | Nicastro _____ 128—142.2 |

FOREIGN PATENTS

| | | |
|---|---|---|
| 901,334 | 7/1962 | Great Britain. |
| 870,636 | 6/1961 | Great Britain. |

LEO FRIAGLIA, *Primary Examiner.*

U.S. Cl. X.R.

280—5.3; 254—86